United States Patent
Hart

(10) Patent No.: US 8,591,364 B2
(45) Date of Patent: Nov. 26, 2013

(54) PLANETARY TRANSMISSION WITH LAUNCH CLUTCH

(75) Inventor: James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 13/324,229

(22) Filed: Dec. 13, 2011

(65) Prior Publication Data

US 2012/0178572 A1 Jul. 12, 2012

Related U.S. Application Data

(60) Provisional application No. 61/430,523, filed on Jan. 6, 2011.

(51) Int. Cl.
 *F16H 31/00* (2006.01)

(52) U.S. Cl.
 USPC ............. 475/116; 475/86; 475/121; 475/123; 475/128; 475/276; 475/280; 475/290; 192/69.5

(58) Field of Classification Search
 USPC .......... 475/116, 86, 121, 123, 128, 69.5, 276, 475/280, 290
 See application file for complete search history.

(56) References Cited

U.S. PATENT DOCUMENTS

| | | | | |
|---|---|---|---|---|
| 3,929,037 A * | 12/1975 | Marsch | ......................... | 475/218 |
| 5,203,862 A * | 4/1993 | Nishida et al. | ................. | 475/282 |
| 5,263,906 A * | 11/1993 | Antonov | ....................... | 475/257 |
| 5,591,099 A * | 1/1997 | Tsukamoto et al. | .......... | 475/318 |
| 6,120,410 A * | 9/2000 | Taniguchi et al. | ............ | 475/285 |
| 8,251,857 B1 * | 8/2012 | Mellet et al. | .................. | 475/280 |
| 2005/0059527 A1 * | 3/2005 | Nielsen | ......................... | 475/279 |
| 2010/0285918 A1 * | 11/2010 | Fitzgerald et al. | ............ | 475/284 |
| 2012/0115663 A1 * | 5/2012 | Wilton et al. | ................. | 475/144 |
| 2013/0053207 A1 * | 2/2013 | Wilton et al. | ................. | 475/276 |

* cited by examiner

*Primary Examiner* — David D Le
*Assistant Examiner* — Derek D Knight

(57) ABSTRACT

A transmission system is provided having an input member, an output member, four planetary gear sets, a plurality of coupling members a plurality of torque transmitting devices, a launch clutch, and a hydraulic circuit. Each of the planetary gear sets includes first, second and third members. The torque transmitting devices may include clutches and brakes.

22 Claims, 3 Drawing Sheets

| GEAR STATE | GEAR RATIO | RATIO STEP | 230 | 232 | 234 | 236 | 226 | 228 |
|---|---|---|---|---|---|---|---|---|
| REV | -5.550 | | X | | | X | | |
| N | | -0.96 | | | | O | | |
| 1ST | 5.767 | | | X | | X | | |
| 2ND | 3.461 | 1.67 | | | | X | | X |
| 3RD | 2.437 | 1.42 | | X | | | | X |
| 4TH | 1.687 | 1.44 | | | X | | | X |
| 5TH | 1.278 | 1.32 | X | | | | | X |
| 6TH | 1.000 | 1.28 | | | | | X | X |
| 7TH | 0.828 | 1.21 | X | | | | X | |
| 8TH | 0.721 | 1.15 | | | X | | X | |
| 9TH | 0.641 | 1.13 | | X | | | X | |

PLANETARY TRANSMISSION WITH LAUNCH CLUTCH

CROSS-REFERENCE TO RELATED APPLICATIONS

This application claims the benefit of U.S. Provisional Application No. 61/430,523 filed on Jan. 6, 2011. The disclosure of the above application is incorporated herein by reference.

FIELD

The invention relates generally to a multiple speed transmission having a plurality of planetary gear sets and a launch clutch.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission system is provided having an input member, an output member, four planetary gear sets, a plurality of coupling members, a plurality of torque transmitting devices, and a launch clutch. Each of the planetary gear sets includes first, second and third members. The torque transmitting devices are for example clutches and brakes.

In an embodiment of the present invention, a transmission includes an input member, an output member, a plurality of planetary gear sets, a launch clutch, a plurality of torque transmitting devices, and a plurality of actuators. The plurality of planetary gear sets each have a first, a second, and a third member. The launch clutch is selectively engageable to connect the input member with an engine output of the vehicle. The plurality of torque transmitting devices are each selectively engageable to connect at least one of the first, second, and third members of at least one of the plurality of planetary gear sets with at least one other of a stationary member and the first, second, and third members of at least one of the plurality of planetary gear sets. Each of the plurality of actuators includes a piston that is translatable to actuate one of the launch clutch and at least one of the plurality of torque transmitting devices, one of the plurality of actuators is configured to selectively actuate the launch clutch. The plurality of actuators and the plurality of torque transmitting devices are selectively engageable to establish a plurality of forward speed ratios and at least one reverse speed ratio between the launch clutch and the output member.

In another aspect of the present invention, the transmission of further includes a sealed hydraulic actuation circuit including a pump and a plurality of fluid passages each connecting the pump to one of the plurality of actuators.

In yet another aspect of the present invention, the pump of the sealed hydraulic actuation circuit is an electric pump.

In yet another aspect of the present invention, the transmission further includes a fluid lubrication circuit that is independent of the sealed hydraulic actuation circuit.

In yet another aspect of the present invention, the fluid lubrication circuit further includes a mechanically driven pump.

In yet another aspect of the present invention, the transmission further includes a transmission housing and at least one bearing each disposed between one of the plurality of torque transmitting devices and the piston of one of the plurality of actuators. Each of the plurality of actuators includes a cylinder defined by the transmission housing and the piston of each of the plurality of actuators is substantially rotationally stationary with respect to the transmission housing.

In yet another aspect of the present invention, the plurality of planetary gear sets includes a first, a second, a third, and a fourth planetary gear set and each of the first, second, and third members of the first and second planetary gear sets is included in one of a first rotary member, a second rotary member, a third rotary member, and a fourth rotary member. Two of the members of the first planetary gear set are directly separately connected with two of the members of the second planetary gear set to form the first and the second rotary members and the fourth rotary member is connected to the launch clutch. Each of the first, second, and third members of the third and fourth planetary gear sets is included in one of a fifth rotary member, a sixth rotary member, a seventh rotary member, and an eighth rotary member and two of the members of the third planetary gear set are directly separately connected with two of the members of the fourth planetary gear set to form the fifth and sixth rotary members and the sixth rotary member is directly connected to the output member. The plurality of torque transmitting devices includes at least six torque transmitting devices each selectively engageable to connect at least one of the first, second, third, fourth, fifth, seventh, and eighth rotary members with at least one other of a stationary member and the first, second, third, fourth, fifth, seventh, and eighth rotary members. The first rotary member and the seventh rotary member are continuously connected to an interconnecting member and the actuators and torque transmitting devices are selectively engageable to establish at least nine forward speed ratios and at least one reverse speed ratio between the input member and the output member.

In yet another aspect of the present invention, a first of the six torque transmitting devices is selectively engageable to connect the fourth rotary member with the fifth rotary member.

In yet another aspect of the present invention, a second of the six torque transmitting devices is selectively engageable to connect the fourth rotary member with the eighth rotary member.

In yet another aspect of the present invention, a third of the six torque transmitting devices is selectively engageable to connect the third rotary member with the stationary member.

In yet another aspect of the present invention, a fourth of the six torque transmitting devices is selectively engageable to connect the second rotary member with the stationary member.

In yet another aspect of the present invention, a fifth of the six torque transmitting devices is selectively engageable to connect the first rotary member, the interconnecting member, and the seventh rotary member with the stationary member.

In yet another aspect of the present invention, a sixth of the six torque transmitting devices is selectively engageable to connect the fifth rotary member with the stationary member.

In yet another aspect of the present invention, the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member.

In yet another aspect of the present invention, the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
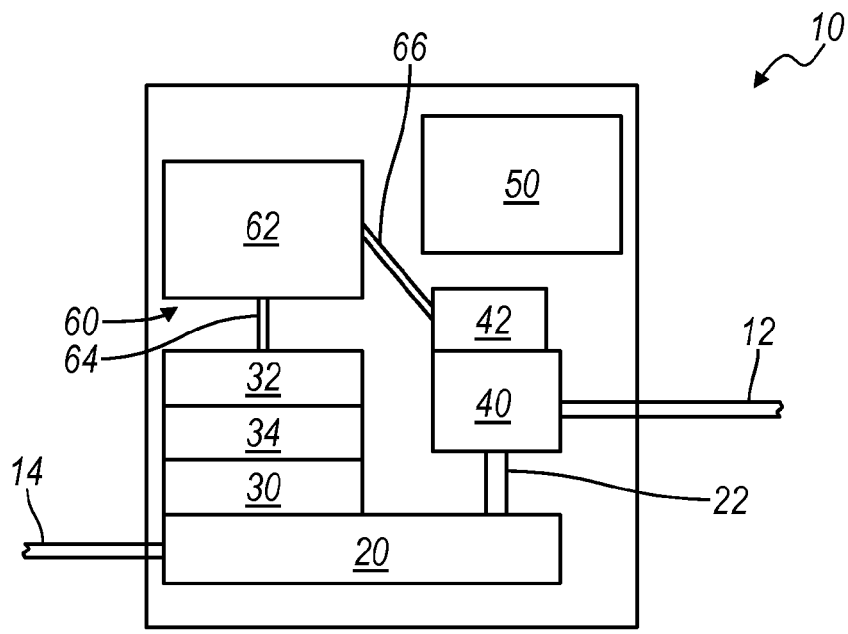
FIG. 1 is a schematic diagram of a transmission according to the principles of the present invention.

Referring to FIG. 1, a schematic diagram of a transmission system 10 is illustrated. The transmission system 10 provides a plurality of gear or speed ratios between an engine shaft 12 and a transmission output 14. The transmission system 10 includes a plurality of planetary gear sets 20, a plurality of clutches or brakes 30, a launch clutch 40, a clutch actuator 42, a lubrication pump 50, and a hydraulic actuation circuit 60. In the example provided the pump 50 is generally a mechanically driven low pressure pump 50 and is separate from the hydraulic actuation circuit 60. The pump 50 provides fluid to a lubrication system or circuit for lubricating the various parts of the transmission.

The hydraulic actuation circuit 60 includes a pump 62, a plurality of clutch actuation passages 64, and a launch clutch actuation passage 66. The hydraulic actuation circuit 60 is substantially sealed from the lubrication system or circuit and hydraulic leakage is limited by use of grounded or non-rotating pistons, as will be described below. In the example presented, the hydraulic actuation circuit 60 includes a hydraulic fluid that has a low temperature viscosity that is lower than typical fluids used for component lubrication. Pump 62 is preferably an electric or a hydrostatic pump. The pump 62 has a capacity selected to meet the design requirements of the vehicle considering the characteristics of the low viscosity hydraulic fluid, the clutches 30, and the launch clutch 40. In the example provided the electric pump 62 has a capacity less than would be required for a pump designed for use in a hydraulic system used for both hydraulic actuation and component lubrication. The clutch actuation passages 64 communicate hydraulic fluid from the pump 62 to the various clutches 30 to achieve various speed ratios. The launch clutch actuation passage 66 communicates hydraulic fluid from the pump 62 to the clutch actuator 42.

Figure 2:
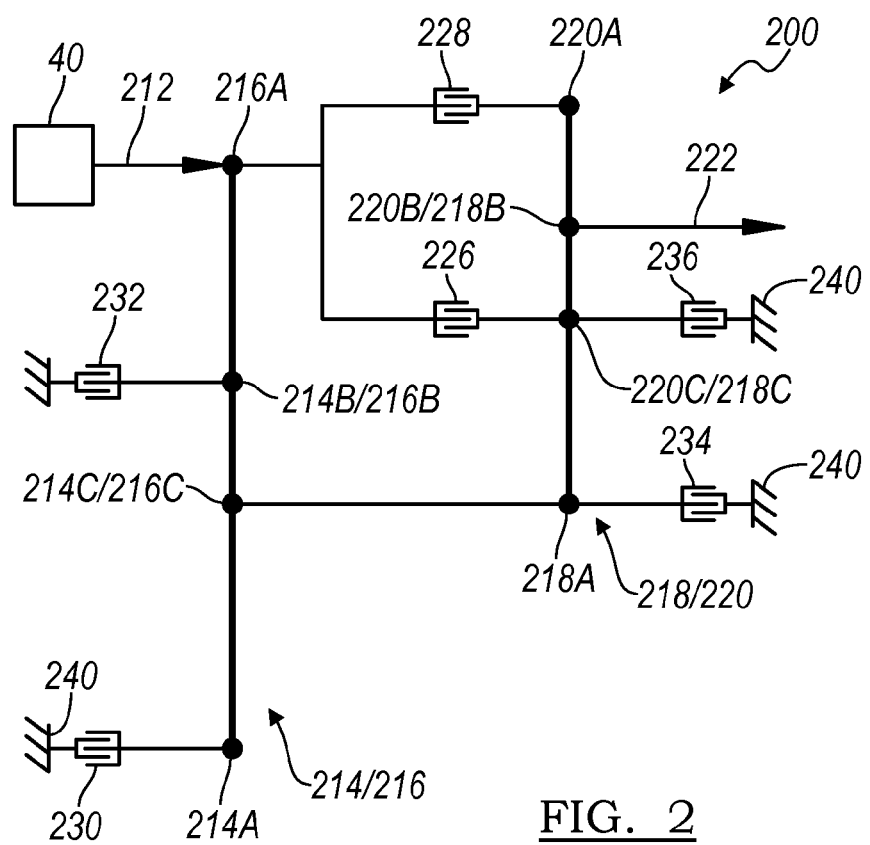
FIG. 2 is a lever diagram of an embodiment of a nine speed transmission according to the principles of the present invention.

Referring now to FIG. 2, an embodiment of a nine speed transmission 200 in accordance with principles of the present invention is illustrated. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference. In the example provided, the overall gear ratio is high enough to provide desirable launch characteristics without the use of torque multiplication that is often found in torque converters.

The transmission 200 includes an input shaft or member 212, a first planetary gear set 214, a second planetary gear set 216, a third planetary gear set 218, a fourth planetary gear set 220, and an output shaft or member 222. The first planetary gear set 214 has a first node 214A, a second node 214B and a third node 214C. The second planetary gear set 216 has a first node 216A, a second node 216B, and a third node 216C. The third planetary gear set 218 has a first node 218A, a second node 218B, and a third node 218C. The fourth planetary gear set 220 has a first node 220A, a second node 220B, and a third node 220C.

The input member 212 is coupled to the launch clutch 40 and the first node 216A of the second planetary gear set 216. The output member 222 is coupled to the second node 218B of the third planetary gear set 218 and the second node 220B of the fourth planetary gear set 220. The second node 214B of the first planetary gear set 214 is coupled to the second node 216B of the second planetary gear set 216. The third node 214C of the first planetary gear set 214 is coupled to the third node 216C of the second planetary gear set 216 and the first node 218A of the third planetary gear set 218. The second node 218B of the third planetary gear set 218 is coupled to the second node 220B of the fourth planetary gear set 220. The third node 218C of the third planetary gear set 18 is coupled to the third node 220C of the fourth planetary gear set 220. It should be appreciated that other combinations of nodes that combine to form a four node lever may be incorporated without departing from the scope of the present invention.

A first clutch 226 selectively connects the first node 216A of the second planetary gear set 216 and the input member 212 with the third node 218C of the third planetary gear set 218 and the third node 220C of the fourth planetary gear set 220. A second clutch 228 selectively connects the first node 216A of the second planetary gear set 216 and the input member 212 with the first node 220A of the fourth planetary gear set 220. A first brake 230 selectively connects the first node 214A of the first planetary gear set 214 to a stationary member or a transmission housing 240. A second brake 232 selectively connects the second node 214B of the first planetary gear set 214 and the second node 2168 of the second planetary gear set 216 to a stationary member or transmission housing 240. A third brake 234 selectively connects the third node 214C of the first planetary gear set, the third node 216C of the second planetary gear set 216, and the first node 218A of the third planetary gear set 218 to the stationary member or transmission housing 240. A fourth brake 236 selectively connects the third node 218C of the third planetary gear set 218 and the third node 220C of the fourth planetary gear set 220 to the stationary member or transmission housing 240.

Figures 3, 5:
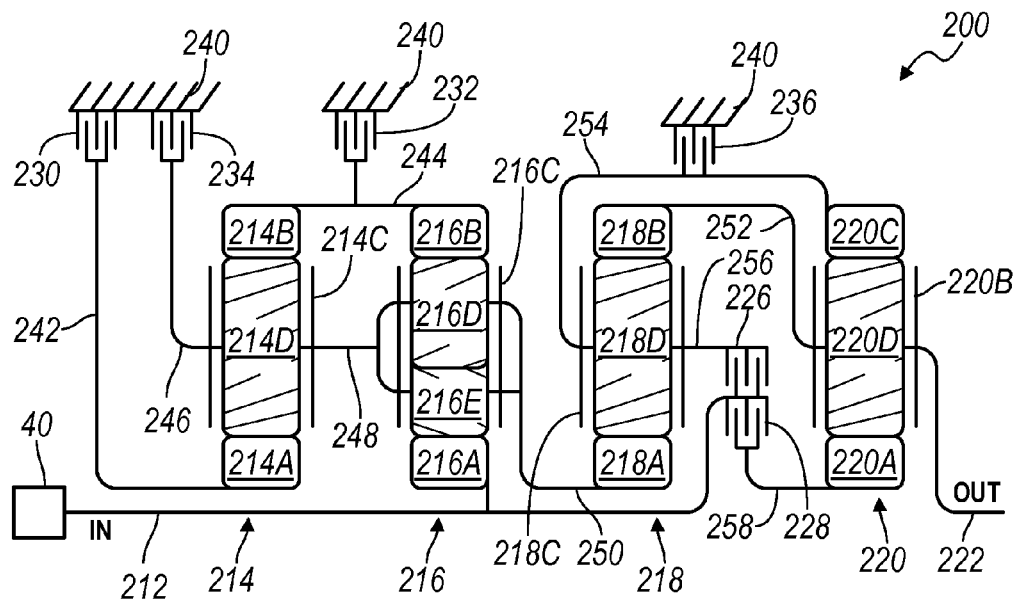
FIG. 3 is a stick diagram of a nine speed transmission according to the principles of the present invention.
FIG. 5 is a truth table presenting the state of engagement of the various torque transmitting elements in each of the available forward and reverse speeds or gear ratios of the transmission illustrated in FIGS. 2-4.
Figure 4:
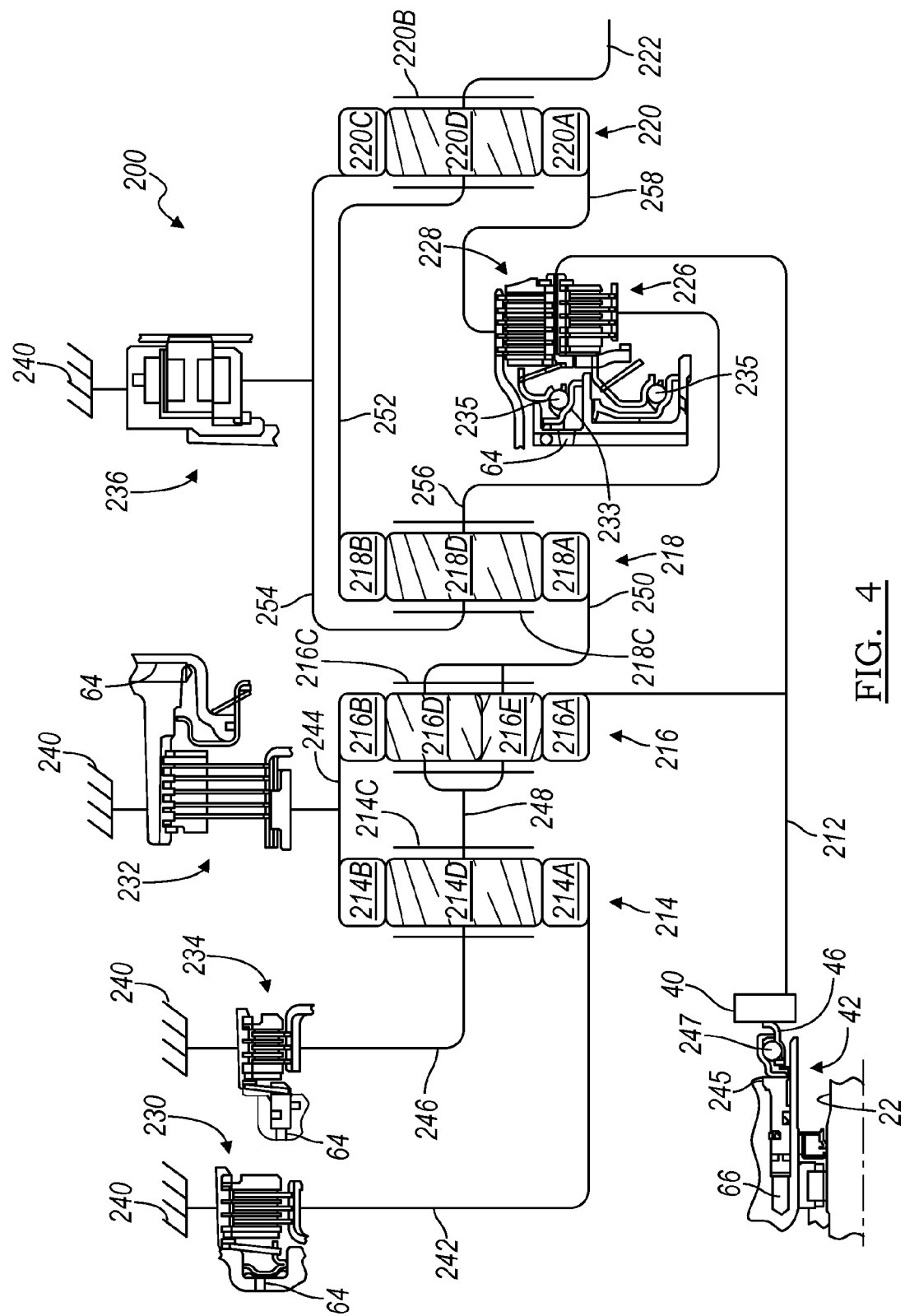
FIG. 4 is a partial cross-sectional view of the transmission shown in FIG. 3.

Referring now to FIGS. 3 and 4, a stick diagram and a partial cross-sectional diagram present an embodiment of the nine speed transmission 200 according to principles of the present invention. In FIGS. 3 and 4, the numbering from the lever diagram of FIG. 2 is carried over. The clutches, brakes, and couplings are correspondingly presented whereas the nodes of the planetary gear sets now appear as components of planetary gear sets such as sun gears, ring gears, planet gears and planet gear carriers.

For example, the first planetary gear set 214 includes a sun gear member 214A, a planet gear carrier member 214C and a ring gear member 214B. The sun gear member 214A is connected for common rotation with a first shaft or interconnecting member 242. The ring gear member 214B is connected for common rotation with a second shaft or interconnecting member 244. The planet gear carrier member 214C rotatably supports a set of planet gears 214D (only one of which is shown) and is connected for common rotation with a third shaft or interconnecting member 246 and a fourth shaft or interconnecting member 248. The planet gears 214D are each configured to intermesh with both the sun gear member 214A and the ring gear member 214B.

The second planetary gear set 216 includes a sun gear member 216A, a planet carrier member 216C that rotatably supports a set of planet gears 216D and 216E, and a ring gear member 216B. The sun gear member 216A is connected for common rotation with the input member 212. The ring gear member 216B is connected for common rotation with the second shaft or interconnecting member 244. The planet carrier member 216C is connected for common rotation with the fourth shaft or interconnecting member 248 and a fifth shaft or interconnecting member 250. The planet gears 216D are each configured to intermesh with both the ring gear member 216B and the planet gears 216E. The planet gears 216E are each configured to intermesh with both the planet gears 216D and the sun gear 216A.

The third planetary gear set 218 includes a sun gear member 218A, a ring gear member 218B and a planet carrier member 218C that rotatably supports a set of planet gears 218D. The sun gear member 218A is connected for common rotation with the fifth interconnecting member 250. The ring gear member 218B is connected for common rotation with a sixth shaft or interconnecting member 252. The planet carrier member 218C is connected for common rotation with a seventh shaft or interconnecting member 254 and with an eighth shaft or interconnecting member 256. The planet gears 218D are each configured to intermesh with both the sun gear member 218A and the ring gear member 218B.

The fourth planetary gear set 220 includes a sun gear member 220A, a ring gear member 220C and a planet carrier member 220B that rotatably supports a set of planet gears 220D. The sun gear member 220A is connected for common rotation with a ninth shaft or interconnecting member 258. The ring gear member 220C is connected for common rotation with the seventh interconnecting member 254. The planet carrier member 220B is connected for common rotation with the sixth interconnecting member 252 and with the output member 222. The planet gears 220D are each configured to intermesh with both the sun gear member 220A and the ring gear member 220C.

The input shaft or member 212 is connected to the launch clutch 40. The output shaft or member 222 is preferably continuously connected with the final drive unit or transfer case (not shown).

The torque-transmitting mechanisms or clutches 226, 228 and brakes 230, 232, 234, 236 allow for selective interconnection of the shafts or interconnecting members, members of the planetary gear sets and the housing. For example, the first clutch 226 is selectively engageable to connect the eighth interconnecting member 256 with the input member 212. The second clutch 228 is selectively engageable to connect the ninth interconnecting member 258 with the input member 212. The first brake 230 is selectively engageable to connect the first interconnecting member 242 to the stationary member or transmission housing 240 in order to restrict the sun gear member 214A of the first planetary gear set 214 from rotating relative to the stationary member or transmission housing 240. The second brake 232 is selectively engageable to connect the second interconnecting member 244 to the stationary member or transmission housing 240 in order to restrict the ring gear member 214B of the first planetary gear set 214 and the ring gear member 216B of the second planetary gear set 216 from rotating relative to the stationary member or transmission housing 240. The third brake 234 is selectively engageable to connect the third interconnecting member 246 to the stationary member or transmission housing 240 in order to restrict the planet carrier member 214C of the first planetary gear set 214, the planet carrier member 216C of the second planetary gear set 216, and the sun gear 218A of the third planetary gear set 218 from rotating relative to the stationary member or transmission housing 240. The fourth brake 236 is selectively engageable to connect the seventh interconnecting member 254 to the stationary member or transmission housing 240 in order to restrict the planet carrier member 218C of the third planetary gear set 218 and the ring gear member 220C of the fourth planetary gear set 220 from rotating relative to the stationary element or transmission housing 240.

The torque transmitting devices 226, 228, 230, 232, 234, 236 are actuated by grounded pistons 233 to reduce leakage that may be associated with rotating seals. In the example provided the hydraulic actuation circuit 60 actuates the grounded pistons 233 which actuate the torque transmitting devices 226, 228, 230, 232, 234, 236 through bearings 235. The launch clutch 40 may be a dry clutch or a wet clutch. In the example provided the launch clutch 40 is a dry plate friction clutch. It should be appreciated that the launch clutch 40 may be a wet clutch without departing from the scope of the present invention. The clutch actuator 42 is a sealed piston actuator having a grounded or non-rotating piston 245 that is actuated by the hydraulic actuation circuit 60. The piston 245 actuates the launch clutch 40 through a bearing 247 to result in essentially no leakage.

Referring now to FIGS. 1-5, the operation of the embodiment of the nine speed transmission 200 will be described. It will be appreciated that the transmission 200 is capable of transmitting torque from the input shaft or member 212 to the output shaft or member 222 in at least nine forward speed or torque ratios and at least one reverse speed or torque ratio. Each forward and reverse speed or torque ratio is attained by engagement of one or more of the torque-transmitting mechanisms (i.e. first clutch 226, second clutch 228, first brake 230, second brake 232, third brake 234, and fourth brake 236), as will be explained below. FIG. 5 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 5. Of course, other gear ratios are achievable depending on the gear diameter, gear teeth count and gear configuration selected.

To establish reverse gear, the first brake 230 and the fourth brake 236 are engaged or activated. The first brake 230 connects the first interconnecting member 242 to the stationary member or transmission housing 240 in order to restrict the sun gear member 214A of the first planetary gear set 214 from rotating relative to the stationary member or transmission housing 240. The fourth brake 236 connects the seventh interconnecting member 254 to the stationary member or transmission housing 240 in order to restrict the planet carrier member 218C of the third planetary gear set 218 and the ring gear member 220C of the fourth planetary gear set 220 from rotating relative to the stationary element or transmission housing 240. Likewise, the nine forward ratios are achieved through different combinations of clutch and brake engagement, as shown in FIG. 5.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission for a vehicle, the transmission comprising:
   an input member;
   an output member;
   a plurality of planetary gear sets each having a first, a second, and a third member;
   a launch clutch selectively engageable to connect the input member with an engine output of the vehicle;
   a plurality of torque transmitting devices each selectively engageable to connect at least one of the first, second, and third members of at least one of the plurality of planetary gear sets with at least one other of a stationary member and the first, second, and third members of at least one of the plurality of planetary gear sets;
   a plurality of actuators, wherein each of the plurality of actuators includes a cylinder and a piston that is translatable to actuate one of the launch clutch and at least one of the plurality of torque transmitting devices, and wherein the piston of each of the plurality of actuators is substantially rotationally stationary with respect to the cylinder, and wherein a first of the plurality of actuators is configured to selectively actuate the launch clutch;
   an apply through bearing disposed between the first of the plurality of actuators and the launch clutch; and
   a sealed hydraulic control system in fluid communication with the plurality of actuators, and
   wherein the plurality of actuators and the plurality of torque transmitting devices are selectively engageable to establish a plurality of forward speed ratios and at least one reverse speed ratio between the launch clutch and the output member.

2. The transmission of claim 1 wherein the sealed hydraulic control circuit includes a pump and a plurality of fluid passages each connecting the pump to one of the plurality of actuators.

3. The transmission of claim 2 wherein the pump of the sealed hydraulic control circuit is an electric pump.

4. The transmission of claim 2 further including a fluid lubrication circuit that is independent of the sealed hydraulic actuation circuit.

5. The transmission of claim 4 wherein the fluid lubrication circuit further includes a mechanically driven pump.

6. The transmission of claim 1 further including a transmission housing and at least one bearing each disposed between one of the plurality of torque transmitting devices and the piston of one of the plurality of actuators, and wherein the cylinder of each of the plurality of actuators is defined by the transmission housing.

7. The transmission of claim 1 wherein the plurality of planetary gear sets includes a first, a second, a third, and a fourth planetary gear set, and wherein each of the first, second, and third members of the first and second planetary gear sets is included in one of a first rotary member, a second rotary member, a third rotary member, and a fourth rotary member, and wherein two of the members of the first planetary gear set are directly separately connected with two of the members of the second planetary gear set to form the first and the second rotary members, and wherein the fourth rotary member is connected to the launch clutch, and wherein each of the first, second, and third members of the third and fourth planetary gear sets is included in one of a fifth rotary member, a sixth rotary member, a seventh rotary member, and an eighth rotary member, and wherein two of the members of the third planetary gear set are directly separately connected with two of the members of the fourth planetary gear set to form the fifth and sixth rotary members and wherein the sixth rotary member is directly connected to the output member, and wherein the plurality of torque transmitting devices includes at least six torque transmitting devices each selectively engageable to connect at least one of the first, second, third, fourth, fifth, seventh, and eighth rotary members with at least one other of a stationary member and the first, second, third, fourth, fifth, seventh, and eighth rotary members, and wherein the first rotary member and the seventh rotary member are continuously connected to an interconnecting member, and wherein the actuators and torque transmitting devices are selectively engageable to establish at least nine forward speed ratios and at least one reverse speed ratio between the input member and the output member.

8. The transmission of claim 7 wherein a first of the six torque transmitting devices is selectively engageable to connect the fourth rotary member with the fifth rotary member.

9. The transmission of claim 8 wherein a second of the six torque transmitting devices is selectively engageable to connect the fourth rotary member with the eighth rotary member.

10. The transmission of claim 9 wherein a third of the six torque transmitting devices is selectively engageable to connect the third rotary member with the stationary member.

11. The transmission of claim 10 wherein a fourth of the six torque transmitting devices is selectively engageable to connect the second rotary member with the stationary member.

12. The transmission of claim 11 wherein a fifth of the six torque transmitting devices is selectively engageable to connect the first rotary member, the interconnecting member, and the seventh rotary member with the stationary member.

13. The transmission of claim 12 wherein a sixth of the six torque transmitting devices is selectively engageable to connect the fifth rotary member with the stationary member.

14. The transmission of claim 1 wherein the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member.

15. The transmission of claim 14 the wherein the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

16. A transmission for a vehicle, the transmission comprising:
an input member;
an output member;
a first and a second planetary gear set each having a first, a second, and a third member, wherein each of the first, second, and third members is included in one of a first rotary member, a second rotary member, a third rotary member, and a fourth rotary member, and wherein two of the members of the first planetary gear set are directly separately connected with two of the members of the second planetary gear set to form the first and the second rotary members;
a third and a fourth planetary gear set each having a first, a second, and a third member, wherein each of the first, second, and third members is included in one of a fifth rotary member, a sixth rotary member, a seventh rotary member, and an eighth rotary member, and wherein two of the members of the third planetary gear set are directly separately connected with two of the members of the fourth planetary gear set to form the fifth and sixth rotary members and wherein the sixth rotary member is directly connected to the output member;
a launch clutch selectively engageable to connect the input member with an engine output shaft of the vehicle, wherein the launch clutch is a friction clutch that substantially rotationally couples the input member with the engine output shaft;
a launch clutch actuator having a piston that is translatable to actuate the launch clutch;
an interconnecting member continuously connected to the first rotary member and the seventh rotary member;
a first torque transmitting device selectively engageable to connect the fourth rotary member with the fifth rotary member;
a first actuator having a piston that is translatable to actuate the first torque transmitting device;
a second torque transmitting device selectively engageable to connect the fourth rotary member with the eighth rotary member;
a second actuator having a piston that is translatable to actuate the second torque transmitting device;
a third torque transmitting device selectively engageable to connect the third rotary member with a stationary member;
a third actuator having a piston that is translatable to actuate the third torque transmitting device;
a fourth torque transmitting device selectively engageable to connect the second rotary member with the stationary member;
a fourth actuator having a piston that is translatable to actuate the fourth torque transmitting device;
a fifth torque transmitting device selectively engageable to connect the first rotary member, the interconnecting member, and the seventh rotary member with the stationary member;
a fifth actuator having a piston that is translatable to actuate the fifth torque transmitting device;
a sixth torque transmitting device selectively engageable to connect the fifth rotary member with the stationary member; and
a sixth actuator having a piston that is translatable to actuate the sixth torque transmitting device, and
wherein the actuators and torque transmitting devices are selectively engageable in combinations of at least two to establish at least nine forward speed ratios and at least one reverse speed ratio between the input member and the output member.

17. The transmission of claim 16 further including a sealed hydraulic actuation circuit including an electric pump and a plurality of fluid passages each connecting the pump to one of the launch clutch actuator, the first actuator, the second actuator, the third actuator, the fourth actuator, the fifth actuator, and the sixth actuator, and wherein each of the first, second, third, fourth, fifth, sixth, and launch actuators includes a cylinder defined by the transmission housing, and wherein the piston of each of the first, second, third, fourth, fifth, sixth, and launch actuators is substantially rotationally stationary with respect to the transmission housing.

18. The transmission of claim 16 further including a fluid lubrication circuit that is independent of the sealed hydraulic actuation circuit, wherein the fluid lubrication circuit includes a mechanically driven pump.

19. The transmission of claim 16 further including a plurality of bearings each disposed between one of the launch clutch, the first, second, third, fourth, fifth, and sixth torque transmitting devices and the launch actuator, the piston of one of the first, second, third, fourth, fifth, and sixth actuators.

20. The transmission of claim 19 wherein the plurality of bearings includes a launch bearing, a first bearing, and a second bearing, wherein the launch bearing is disposed between the launch clutch and the launch clutch actuator, the first bearing is disposed between the first torque transmitting device and the first actuator, and the second bearing is disposed between the second torque transmitting device and the second actuator.

21. The transmission of claim 16 wherein the third member of the first planetary gear set and the third member of the second planetary gear set form the first rotary member, the second member of the first planetary gear set and the second member of the second planetary gear set form the second rotary member, the first member of the first planetary gear set forms the third rotary member, the first member of the second planetary gear set forms the fourth rotary member, the third member of the third planetary gear set and the third member of the fourth planetary gear set form the fifth rotary member, the second member of the third planetary gear set and the second member of the fourth planetary gear set form the sixth rotary member, the first member of the third planetary gear set forms the seventh rotary member, and the first member of the fourth planetary gear set forms the eighth rotary member.

22. The transmission of claim 21 the wherein the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

* * * * *